(12) United States Patent
Tyaglin

(10) Patent No.: US 11,614,074 B2
(45) Date of Patent: Mar. 28, 2023

(54) WIND POWER INSTALLATION

(71) Applicant: Denis Valentinovich Tyaglin, Novosibirsk (RU)

(72) Inventor: Denis Valentinovich Tyaglin, Novosibirsk (RU)

(*) Notice: Subject to any disclaimer, the term of this patent is extended or adjusted under 35 U.S.C. 154(b) by 171 days.

(21) Appl. No.: 16/753,144

(22) PCT Filed: Oct. 16, 2018

(86) PCT No.: PCT/RU2018/000686
§ 371 (c)(1),
(2) Date: Apr. 2, 2020

(87) PCT Pub. No.: WO2019/083411
PCT Pub. Date: May 2, 2019

(65) Prior Publication Data
US 2020/0256317 A1    Aug. 13, 2020

(30) Foreign Application Priority Data

Oct. 24, 2017   (RU) ................................ 2017137229

(51) Int. Cl.
*F03D 9/45*          (2016.01)
*F03D 13/10*         (2016.01)
(Continued)

(52) U.S. Cl.
CPC ................. *F03D 9/45* (2016.05); *F03D 3/00* (2013.01); *F03D 3/005* (2013.01); *F03D 3/02* (2013.01);
(Continued)

(58) Field of Classification Search
CPC ............ F03D 9/45; F03D 3/005; F03D 13/10; F03D 13/20; F03D 13/22; F03D 3/04;
(Continued)

(56) References Cited

U.S. PATENT DOCUMENTS

| 4,059,969 A | * | 11/1977 | Awalt, Jr. ................. | F25B 27/00 |
| | | | | 415/121.3 |
| 6,172,429 B1 | * | 1/2001 | Russell .................... | F03D 13/20 |
| | | | | 290/55 |
| 8,961,103 B1 | * | 2/2015 | Wolff ...................... | F03D 3/005 |
| | | | | 415/4.4 |
| 9,294,013 B2 | * | 3/2016 | Allaei ....................... | F03D 9/25 |

(Continued)

FOREIGN PATENT DOCUMENTS

| CN | 107288821 A | * | 10/2017 |
| JP | 2013542368 A | * | 11/2013 |

(Continued)

*Primary Examiner* — Andrew J Triggs
(74) *Attorney, Agent, or Firm* — Georgiy L. Khayet

(57) ABSTRACT

Provided is a wind power installation for converting the kinetic energy of the wind into the mechanical energy of rotation of a rotor for subsequent conversion of the mechanical energy of rotation into the electrical energy. A wind power installation includes a support frame, a shaft disposed on the support frame, and a blade system mounted on the shaft. The shaft is configured to rotate about a vertical axis and is functionally connected to an electric generator. The support frame is configured to be mounted between at least three radially arranged structures. The wind power installation can include additional blade systems disposed one above another on the shaft. Mounting the support frame between three radially arranged structures results in greater rigidity and robustness of the wind power installation, thus enabling the use of blade systems having a larger blade area and the arrangement of several blade systems on the shaft.

19 Claims, 2 Drawing Sheets

(51) Int. Cl.
  *F03D 13/20* (2016.01)
  *F03D 3/00* (2006.01)
  *F03D 3/04* (2006.01)
  *F03D 3/02* (2006.01)
  *F03D 9/34* (2016.01)

(52) U.S. Cl.
  CPC .............. *F03D 3/04* (2013.01); *F03D 3/0409* (2013.01); *F03D 3/0454* (2013.01); *F03D 9/34* (2016.05); *F03D 13/10* (2016.05); *F03D 13/20* (2016.05); *F05B 2240/9112* (2013.01); *Y02B 10/30* (2013.01); *Y02E 10/728* (2013.01); *Y02E 10/74* (2013.01)

(58) Field of Classification Search
  CPC ........ F03D 3/0409; F03D 3/0454; F03D 3/00; F03D 3/02; F03D 9/34; F05B 2240/9112; Y02B 10/30; Y02E 10/74; Y02E 10/728
  See application file for complete search history.

(56) References Cited

U.S. PATENT DOCUMENTS

| | | | | |
|---|---|---|---|---|
| 9,938,958 | B2* | 4/2018 | Rubio | F03B 17/063 |
| 2009/0246027 | A1* | 10/2009 | Johnson | F03D 3/062 |
| | | | | 416/243 |
| 2014/0056708 | A1* | 2/2014 | Samson | F03D 13/20 |
| | | | | 416/170 R |
| 2016/0153429 | A1* | 6/2016 | Allaei | F03D 1/025 |
| | | | | 29/889.22 |
| 2017/0045034 | A1* | 2/2017 | Lai | F03D 3/0427 |
| 2019/0024633 | A1* | 1/2019 | Blanco | F03D 13/20 |
| 2020/0256317 | A1* | 8/2020 | Tyaglin | F03D 13/22 |

FOREIGN PATENT DOCUMENTS

| | | | | |
|---|---|---|---|---|
| RU | | 57841 U1 | 10/2006 | |
| RU | | 61362 U1 | 2/2007 | |
| WO | WO-2013032415 A1 * | | 3/2013 | ............ F03D 13/20 |

* cited by examiner

WIND POWER INSTALLATION

The technical solution relates to wind power engineering and is intended for converting the kinetic energy of the wind into the mechanical energy of rotation of a blade system for subsequent conversion of the mechanical energy of rotation into the electrical energy.

The technical solution named "Wind Power Installation" is known from the prior art, in which the wind power installation includes a housing and a working shaft mounted in the housing and configured to freely rotate about a vertical axis, a wind wheel mounted on the working shaft and made in the form of a truncated cone, and blades attached along the generatrixes of the cone. The housing includes a rack-bracket and a base. Utility model patent No. 155147 of the Russian Federation, IPC F03D 3/06, F03D 11/00, published on Sep. 20, 2015.

This technical solution and the claimed technical solution have the following common features:
  providing the frame,
  providing the shaft mounted on the frame and configured to rotate about a vertical axis and functionally connected to an electric generator,
  providing the wind wheel mounted on the shaft.

This technical solution and the claimed technical solution have the following distinctive features:
  providing the frame configured to be mounted between three radially arranged structures.

The disadvantage of this technical solution is the low power of the wind power installation, since the proposed structure of the housing and variants for mounting the shaft and the wind wheel do not provide the rigidity of the structure and the stability of the wind power installation sufficient for using blade systems with large blade areas.

The technical solution named "SIROTA WIND-DRIVEN POWER TOWER" is known from the prior art and selected as the closest analogue. This technical solution includes a support structure having several vertical towers around it, an annular platform mounted so as to rotate about a vertical axis, and blades disposed on the annular platform. The annular platform is disposed on the support structure and fixed in the upper portion of the support structure. Invention patent No. 2508470 of the Russian Federation, IPC F03D 3/00, F03D 11/04, published on Feb. 27, 2014.

This technical solution and the claimed technical solution have the following common features:
  providing the frame,
  providing the shaft mounted so as to rotate about a vertical axis and functionally connected to an electric generator,
  providing the blades mounted on the annular platform.

This technical solution and the claimed technical solution have the following distinctive features:
  providing the frame configured to be mounted between three radially arranged structures.

DETAILED DESCRIPTION

Figure 1:
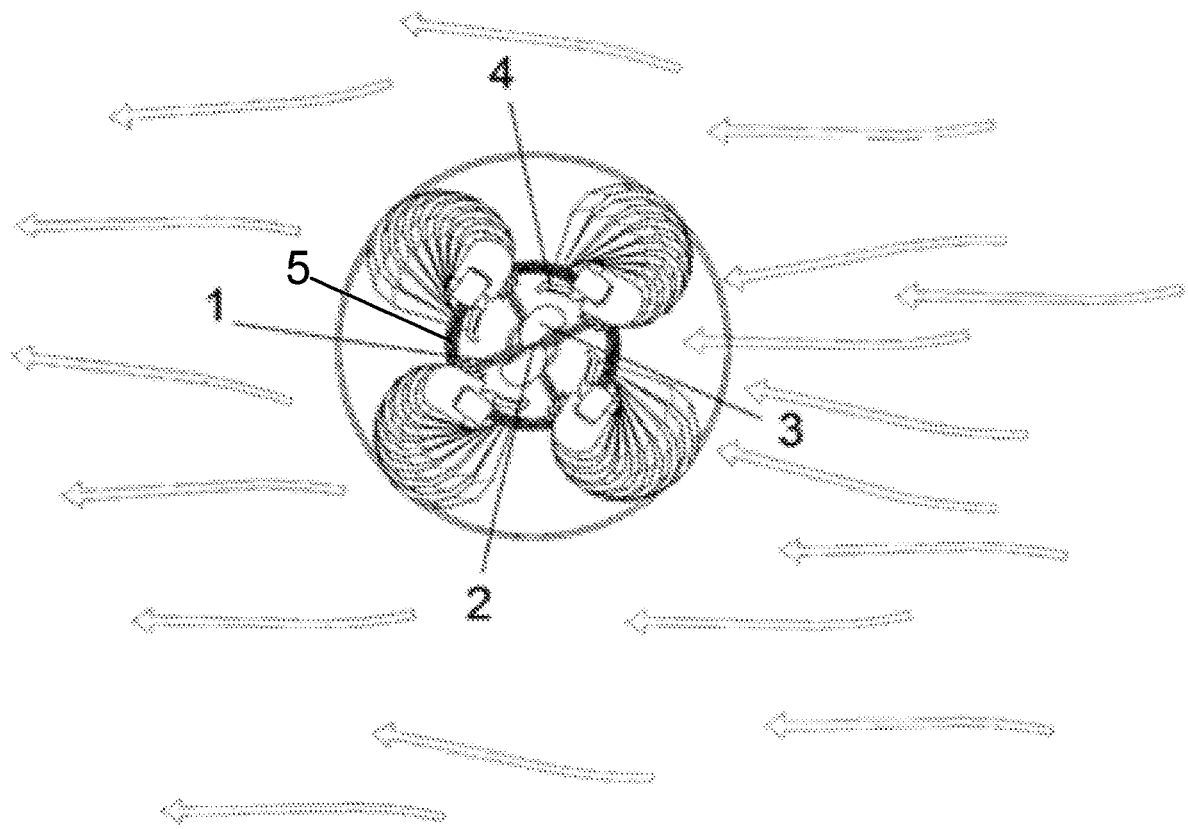
FIG. 1 is a top view of a wind power installation, according to an example embodiment.

The disadvantage of this technical solution is the high material consumption of the structure of the wind power installation, since in order to achieve the height of the structure at which the potential of the wind energy becomes the most effective and approaches almost constant operation with very slight fluctuations, it is necessary to build a structure having a height of about 200 meters. At the same time, it is necessary to limit the speed of rotation of the annular platform to exclude vibrational loads on the entire structure of the wind power installation.

The objective of the claimed technical solution is to overcome the disadvantages of the known technical solutions and create a wind power installation having high efficiency and reliability.

The technical effect of the claimed technical solution is an increase in the operating efficiency of the wind power installation.

The claimed technical effect is achieved by that in the wind power installation, which comprises at least one support frame with a shaft disposed on the support frame, where the shaft is configured to rotate about a vertical axis and is functionally connected to an electric generator, and a blade system attached to the shaft, the claimed technical solution provides the support frame configured to be mounted between at least three radially arranged structures. The area of one blade of the blade system is selected from a range between 20 and 1000 sq. m. The wind power installation can include additional blade systems arranged one above another on the shaft. The blade of the blade system can be made, for example, in the form of a sail.

The shaft of the wind power installation, which is rotatably mounted on the support frame, is structurally connected to the electric generator by any method known in the art for transmitting the rotation caused by the influence of the kinetic wind energy on the blades of the blade system into the mechanical energy of rotation of the elements of the electric generator to convert the mechanical energy of rotation into the electrical energy. In addition, the electric generator itself can be either directly connected to the rotating shaft, or placed separately using the known method of transmitting the rotation. The shaft can be mounted on the frame by any known method, for example, at two points, namely in the upper and lower portions of the frame.

The placement of the support frame between at least three radially arranged structures and securing the shaft to the support frame ensures the stability and reliability of the entire structure, which allows using the blade systems having large parameters, for example, those having the area of one blade of from 20 to 1000 square meters, thereby reducing vibrational loads on the structure of the wind power installation and simultaneously increasing the operating efficiency and power of the wind power installation.

Moreover, fixing of the support frame between at least three radially arranged streamlined structures allows increasing the operating efficiency of the wind power installation, since an air passage created by three radially arranged structures allows the formation of enhanced wind flows at any wind direction to affect the blade system even when the blade system is mounted at heights at which the wind flows are not yet characterized by permanent action.

To provide the understanding of the claimed technical solution, it should be clarified that radially arranged structures mean structures located in the radial direction relative to the rotation axis of the shaft and are not limited to a variant of arrangement when all structures are placed at the same distance from the rotation axis. The structures can be placed at different distances from the rotation axis of the shaft.

Calculations and developed mathematical models showed that the optimal height of buildings is from 5 to 800 m, and the height of mounting of the first blade system is 5-15 m. The blade systems can be located on the rotor one above the other as shown in FIG. 1. The parameters and the number of blade systems in case of such arrangement are calculated separately for a specific height of the buildings.

Providing the blade system with a vertical axis also increases the operating efficiency and reliability of the wind power installation, since at any changes of the wind direction such arrangement of the blade system will absorb the kinetic energy of the wind in the same good manner, and the support frame on which such system is fixed (as well as the whole structure of the wind power installation) will experience less loads from the wind flow.

Additionally, the wind power installation can be equipped with an air nacelle configured to redirect the air flow entering it by redirecting it to the blades, thereby increasing the operating efficiency of the wind power installation. The air nacelle may be fixed on the frame.

To explain the essence of the claimed technical solution, an embodiment of the structure of the wind power installation is shown in the drawings, where: 1 is a support frame, 2 is a shaft, 3—is blade system, 4 is a nacelle.

The claimed technical solution is used as follows.

Figure 2:
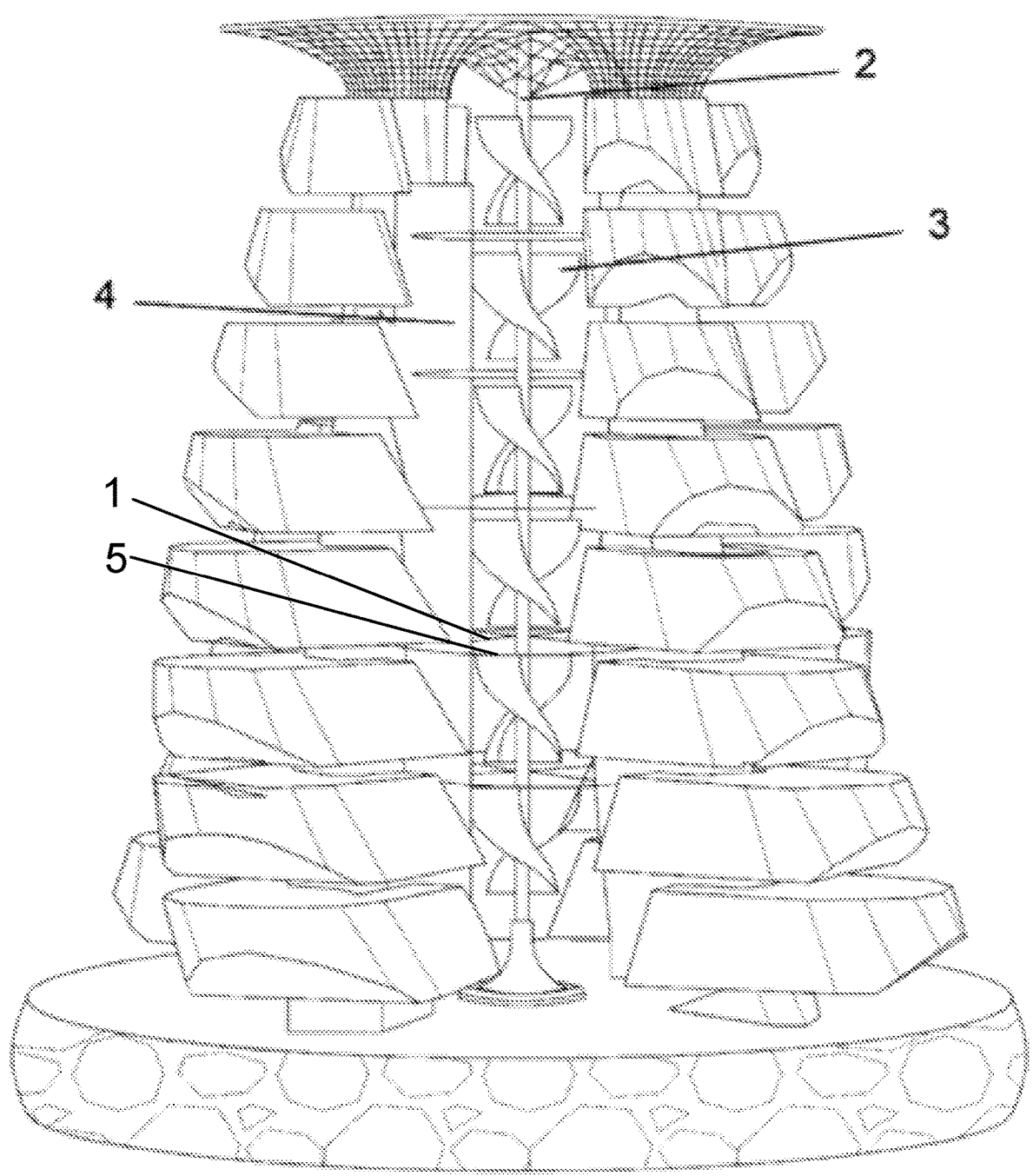
FIG. 2 is a front view of a wind power installation, according to an example embodiment.

Three structures are built by any known methods, in particular, the three structures are multistory buildings made in a form that allows wind flows to flow smoothly around them. The structures can be placed both at an equal distance from each other, and at different distances from each other, so that a space for locating the wind power installation is formed in the center between them. Further, the support frame (1) is rigidly fixed to frames (shown in FIG. 1 and FIG. 2 as a circular frame (5) that interconnects the structures and is circumferentially spaced away from a shaft (2)) of the structures at three points at a pre-calculated height, for example, the height of the lower blade system can be 8 meters for an 80-story building. Then, a shaft (2) having a vertical axis of rotation and functionally connected to the electric generator is mounted on the frame (1). The blade system (3) is placed on the shaft (2). The parameters and the number of blades are calculated based on the wind characteristics of a region, energy requirements, a height of structures, and so forth. The air passage formed by the structures makes it possible to amplify air flows of any direction of the wind, which, when meeting streamlined portions, will be directed to the central portion, where the blade system (3) is located and is capable of absorbing the kinetic energy of the wind and transmit, by rotating, the motion to the shaft (2) and to the electric generator, where the conversion of the rotational energy into the electrical energy is performed. According to mathematical calculations, the wind power installation that includes 7-8 blade systems located one above the other on the shaft mounted on the frame between 80-story buildings can cover the electricity needs of three 80-story buildings by generating at least 7.5 MW by each blade system. Electric power storage devices can be additionally connected to the electric generator. Additionally, the wind power installation can be equipped with an air nacelle (4) configured to redirect the air flow entering it by redirecting it to the blades.

The presented figures and the description of the structure do not illustrate all possible embodiments and do not in any way limit the scope of the claimed technical solution. Other embodiments are possible according to the scope of the claims.

The invention claimed is:

1. A wind power installation comprising:
   a support frame, wherein the support frame is configured to be mounted between and directly attached to at least three radially arranged structures at a predetermined height above a ground surface, wherein the at least three radially arranged structures include buildings;
   a circular frame interconnecting the at least three radially arranged structures at the predetermined height above the ground surface;
   a shaft rotatably secured to the support frame at the predetermined height above the ground surface, wherein the shaft is configured to rotate about a vertical axis, the at least three radially arranged structures being oriented in a radial direction relative to the vertical axis of the shaft; and
   a blade system mounted on the shaft, wherein:
      the circular frame is circumferentially spaced away from the shaft;
      the support frame radially extends from the shaft towards the circular frame; and
      the support frame includes:
         a first support frame end, the first support frame end being rotatably and directly secured to the shaft; and
         a second support frame end, the second support frame end being directly and rigidly fixed to the circular frame at the predetermined height.

2. The wind power installation of claim 1, wherein the at least three radially arranged structures include multistory buildings.

3. The wind power installation of claim 1, wherein the at least three radially arranged structures are positioned at least in one of the following ways: at equal distances from each other and at varying distances from each other.

4. The wind power installation of claim 1, wherein the at least three radially arranged structures are positioned at least in one of the following ways: at equal distances from the vertical axis of the shaft and at varying distances from the vertical axis of the shaft.

5. The wind power installation of claim 1, wherein the support frame is located at a center of a space formed between the at least three radially arranged structures.

6. The wind power installation of claim 1, wherein each of the at least three radially arranged structures has a frame, the support frame being fixed to the frame of each of the at least three radially arranged structures at a predetermined height.

7. The wind power installation of claim 1, wherein the shaft is functionally connected to an electric generator.

8. The wind power installation of claim 7, wherein the blade system is configured to:
   receive kinetic energy of air flowing between the at least three radially arranged structures; and
   in response to the receiving of the kinetic energy, rotate the shaft to convert the kinetic energy into rotational energy, wherein the shaft transmits the rotational energy to the electric generator for further conversion of the rotational energy into electrical energy.

9. The wind power installation of claim 8, further comprising an air nacelle fixed to the support frame and configured to redirect the air to the blade system.

10. The wind power installation of claim 1, wherein the blade system includes a plurality of blades, wherein each of the plurality of blades has an area of between 20 and 1000 square meters.

11. The wind power installation of claim 1, further comprising additional blade systems, wherein the additional blade systems are disposed above the blade system and one above another on the shaft.

12. A method for providing a wind power installation, the method comprising:
- providing a support frame, wherein the support frame is configured to be mounted between and directly attached to at least three radially arranged structures at a predetermined height above a ground surface, wherein the at least three radially arranged structures include buildings;
- providing a circular frame interconnecting the at least three radially arranged structures at the predetermined height above the ground surface;
- providing a shaft rotatably secured to the support frame at the predetermined height above the ground surface, wherein the shaft is configured to rotate about a vertical axis, the at least three radially arranged structures being oriented in a radial direction relative to the vertical axis of the shaft; and
- providing a blade system mounted on the shaft, wherein:
  - the circular frame is circumferentially spaced away from the shaft;
  - the support frame radially extends from the shaft towards the circular frame; and
  - the support frame includes:
    - a first support frame end, the first support frame end being rotatably and directly secured to the shaft; and
    - a second support frame end, the second support frame end being directly and rigidly fixed to the circular frame at the predetermined height.

13. The method of claim 12, wherein the at least three radially arranged structures are positioned at least in one of the following ways: at equal distances from each other and at varying distances from each other.

14. The method of claim 12, wherein the support frame is configured to be located at a center of a space formed between the at least three radially arranged structures.

15. The method of claim 12, wherein the shaft is functionally connected to an electric generator.

16. The method of claim 12, wherein the providing the blade system includes providing a plurality of blades, wherein each of the plurality of blades has an area of between 20 and 1000 square meters.

17. The method of claim 12, further comprising providing an air nacelle fixed to the support frame and configured to redirect air to the blade system.

18. The method of claim 12, further comprising providing additional blade systems, wherein the additional blade systems are disposed one above another on the shaft.

19. A wind power installation comprising:
- a support frame, wherein the support frame is configured to be mounted between and directly attached to at least three radially arranged structures at a predetermined height above a ground surface, wherein the at least three radially arranged structures include buildings, wherein the support frame is configured to be located at a center of a space formed between the at least three radially arranged structures;
- a circular frame interconnecting the at least three radially arranged structures at the predetermined height above the ground surface;
- a shaft rotatably secured to the support frame at the predetermined height above the ground surface, wherein the shaft is configured to rotate about a vertical axis, wherein the at least three radially arranged structures are oriented in a radial direction relative to the vertical axis of the shaft, wherein the shaft is functionally connected to an electric generator; and
- a blade system mounted on the shaft, wherein the blade system includes a plurality of blades;
- additional blade systems, wherein the additional blade systems are disposed above the blade system and one above another on the shaft; and
- an air nacelle fixed to the support frame and configured to redirect air flows to the blade system, wherein:
  - the circular frame is circumferentially spaced away from the shaft;
  - the support frame radially extends from the shaft towards the circular frame; and
  - the support frame includes:
    - a first support frame end, the first support frame end being rotatably and directly secured to the shaft; and
    - a second support frame end, the second support frame end being directly and rigidly fixed to the circular frame at the predetermined height.

* * * * *